Patented July 8, 1930

1,770,283

UNITED STATES PATENT OFFICE

ROBERT W. OSTERMAYER, OF PITTSBURGH, PENNSYLVANIA, ASSIGNOR TO NEVILLE CHEMICAL COMPANY, A CORPORATION OF PENNSYLVANIA

METHOD OF PREPARING COUMARONE-INDENE RESINS

No Drawing.   Application filed June 27, 1929. Serial No. 374,282.

This invention relates to the derivation of a resin from coal tar distillates, and constitutes more specifically an improvement on the method of preparing coumarone-indene resins as described and claimed in Patent No. 1,705,857, issued March 19, 1929, to Ralph M. Emery.

In the patent above noted crude solvent naphtha No. 2, having a coumarone-indene component up to 80% of the whole, is polymerized, and is then diluted with petroleum benzine to precipitate undesired substances, which separate by gravity from the liquid containing the desired products.

By "coumarone-indene", as used throughout the specification and claim, I mean components and resins consisting chiefly of these substances, but which frequently include lesser quantities of other resinous substances. Among the members of such other resinous substances which have been isolated are the following, constituting a partial list only:

Coumarone $(C_6H_4)(C_2H_2O)$.
Indene $(C_6H_4)(C_3H_4)$.
Methyl coumarone
   $(C_6H_3)(C_2H_2O)(CH_3)$.
Dimethyl coumarone
   $(C_6H_2)(C_2H_2O)(CH_3)_2$.
Trimethyl coumarone
   $(C_6H)(C_2H_2O)(CH_3)_3$.
Hydrindene $(C_6H_4)(C_3H_6)$.
Dicyclopentadiene $(C_5H_6)_2$.
Styrolene $(C_6H_5)(CH:CH_2)$.

As in the Emery patent above noted I add a diluent to the polymerized component of solvent naphtha after the polymerizing step of the process, the present method thus differing from my copending application Serial No. 372,542, filed June 20, 1929. As in the Emery process, also, I prefer to polymerize solvent naphtha having a coumarone-indene content which is not substantially greater than 80% of the whole.

While petroleum benzine gives the best average results as a diluent added after polymerization, with reference both to melting point and clarity of the product and ease of separation during the concluding steps of the process, I have found that petroleum distillates both heavier and lighter than petroleum benzine may be advantageously used in order to secure the particular advantages consequent upon the grade of distillate employed. Herein I claim the use of petroleum distillates which are higher on the Baumé scale than petroleum benzine, the use of petroleum distillates lower on the Baumé scale than petroleum benzine being claimed in my copending application Serial No. 374,281, filed June 27, 1929.

According to my method of procedure, crude solvent naphtha is prepared for distillation in the usual manner. It may then be distilled, and several cuts taken, which vary from those containing a relatively small percentage of the coumarone-indene components to the resin oils containing a relatively great percentage, as high as 80%, or more, of these components. A mixture of low melting point resin is left as a still residue. I may then commingle the cuts or proceed with them separately.

I then subject either the separate cuts, or the refined naphtha without fractionation to the action of a suitable polymerizing agent, such as sulphuric acid, anhydrous stannic tetrachloride, or anhydrous phosphoric acid. At the completion of the polymerizing step, a heavy viscous product is obtained. This heavy product I dilute with a liquid petroleum distillate higher on the Baumé scale than petroleum benzine. The undesired products of polymerization, being insoluble in the petroleum distillate, are thus precipitated, and the remaining liquid comprising the diluent and the desired polymerized substances is decanted from the precipitates.

According to previous procedure, the liquid is then washed free of the polymerizing agent and remaining impurities. It is then distilled, the distillation being desirably under a high vacuum in order to remove the solvents more rapidly than is possible under a low vacuum or at atmospheric pressure. The resinous material in the still is then steamed for removal of heavy oils, and the remaining resinous residue constitutes the desired resins, free both of the undesired products of polymerization and free also of any undesired polymerized oil with which the resin may up to that point have been associated. The pure resin residue is drawn off, and cooled.

The procedure according to the Emery patent, and my present method, is somewhat simpler than is the case where the diluent is added before the completion of the polymerizing step. Absolute completion of the polymerizing reaction cannot, however, be approximately so closely as when the diluent is added before the completion of the polymerizing step.

By utilizing as a diluent a petroleum distillate higher on the Baumé scale than petroleum benzine I facilitate the final steps of the process. This is for the reason that there is a lesser degree of emulsification of the product during the step of washing it free of the polymerizing agent, and a lesser difficulty in distilling the diluent from the desired resinous product than is the case with petroleum benzine and petroleum distillates heavier than petroleum benzine.

The product is of a slightly lower melting point, and is not of so high degree of clarity, as is the case where petroleum benzine, or still heavier petroleum distillates, such as kerosene and wash oils are used as diluents. In instances, however, where a high degree of clarity and a high melting point are not of primary importance, the increased facility in conducting the final steps of the process renders desirable the use of petroleum distillates higher on the Baumé scale than petroleum benzine.

What I claim is:

The method herein rescribed of deriving resin from coal tar distillate which consists in preparing a distillate having a coumarone-indene content, polymerizing the prepared distillate with the production of incidental precipitates, diluting the polymerized mass with a petroleum distillate higher on the Baumé scale than petroleum benzine in which diluent such precipitates are insoluble, removing such precipitates, and separating the dissolved resins.

In testimony whereof I have hereunto set my hand.

ROBERT W. OSTERMAYER.